Sept. 25, 1951  J. BERTHELOT  2,569,039
FEEDING SCREW FOR PULVERULENT OR GRANULAR MATERIAL
Filed April 18, 1946  3 Sheets-Sheet 1
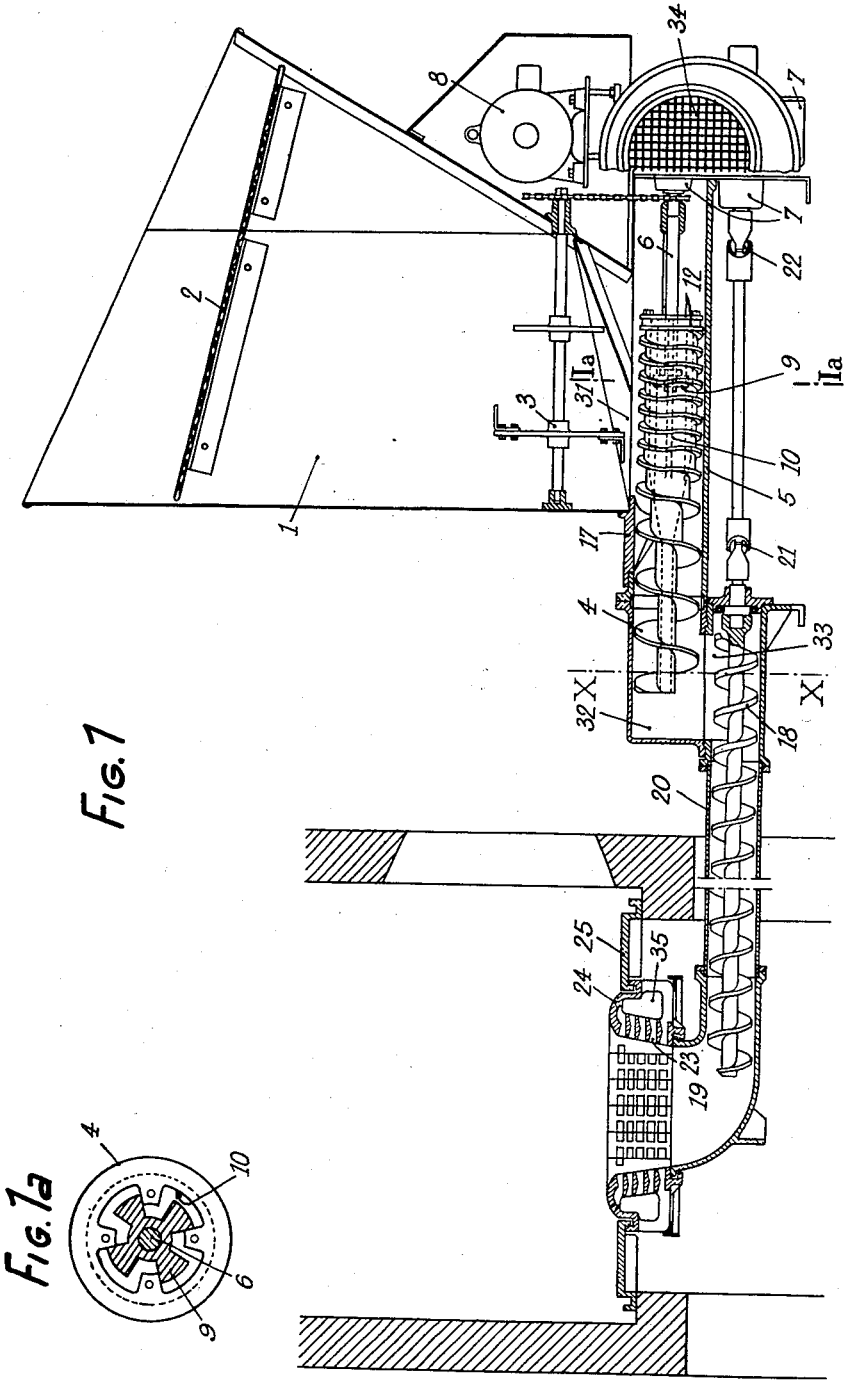
Inventor
Jean Berthelot
By Albert G. McCaleb
atty.

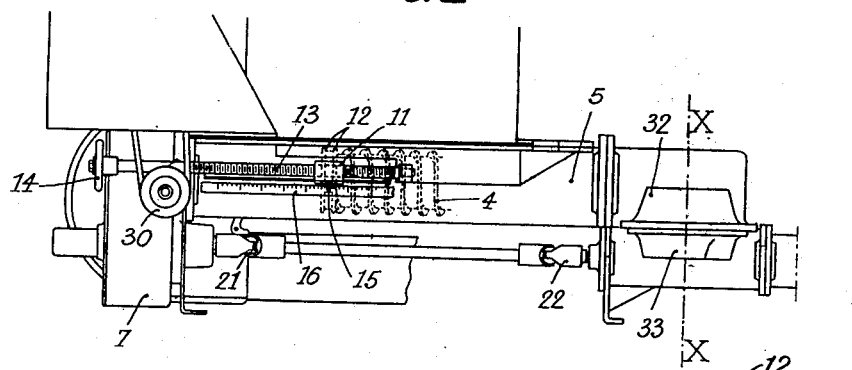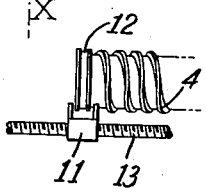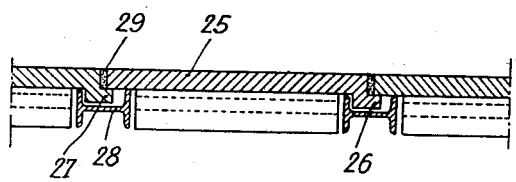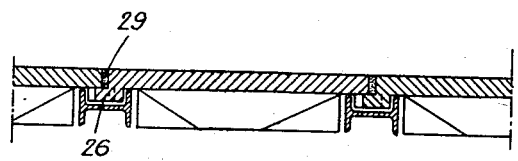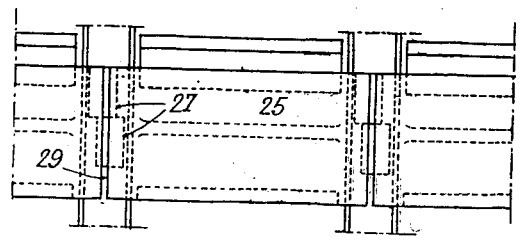

Patented Sept. 25, 1951

2,569,039

UNITED STATES PATENT OFFICE 2,569,039

FEEDING SCREW FOR PULVERULENT OR GRANULAR MATERIAL

Jean Berthelot, Paris, France, assignor, by mesne assignments, to Societe Maxicalor, Benzons, (S. O.), France, a corporation of France Application April 18, 1946, Serial No. 663,020
In France March 24, 1945

1 Claim. (Cl. 198—64)

When it is desired to feed granular or pulverulent material or more generally when it is desired to make such material advance, conveyor screws are ordinarily made use of, such as those known under the name of Archimedes' screws. This is the case for instance in automatic fireboxes provided with a hopper holding the coal and feeding it to a conveyor screw delivering it into a feed tube leading the fuel to the center of the firebox on the under side thereof.

In various applications of such a system of displacing material with a screw, it is necessary to allow an adjustment of the output of displaced material. For instance, in fireboxes, it is generally desired to obtain the largest range of speeds possible through a modification of the amount of fuel fed to the firebox. To this end there is inserted between the power unit driving the screw and said screw a change speed gear which latter may be of two types, either of the discontinuous type or else of the type providing for the continuous variation of speed.

In the first type, the screw is driven intermittently and according to the frequency of the intermittent operation the output is more or less considerable. Such an arrangement shows numerous drawbacks such as loss of energy of the driving power during the intermittent stoppages, wear of the apparatuses by reason of the jerks, blocking of the coal and the like.

In the second case including change speed means operating with gears, speed varying means, pumps and the like, the drawbacks are also numerous. The price of the apparatuses is very high, they are liable to be broken easily and wear rapidly. Blocking is also frequent in the feed screw conveyor, etc.

These drawbacks may be avoided in accordance with the invention which does away with the change speed box and replaces it by a special member forming a measuring screw. This measuring screw removes the material out of the hopper and causes it to advance. It is characterized through the fact that the pitch and diameter of the convolutions vary from one end of the screw to the other and that it may be displaced axially whereby convolutions with a more or less great capacity may be brought in front of the lower opening of the hopper which produces variations in the output. The variation obtained is thus continuous and may be very large. This novel arrangement is capable of easy adaptation and allows obtaining an unlimited number of speeds.

It may be executed through any simple, resistant and cheap means.

In the case of the application of the invention to fireboxes, said measuring screw is associated with the firebox feeding screw. In this case there is obtained a further advantage consisting in that if the measuring screw advances less speedily than the feed screw, the turns of the latter are never entirely full which removes all danger of blocking.

In feed systems, the arrangement comprising the hopper, the driving means and the receiving apparatus form a self-contained unit. For instance in the case of fireboxes, the arrangement of a hopper, motor, fan and firebox forms a rigid rectilinear block; consequently there is an absolute material impossibility of mounting same when the heating chamber is not roomy enough for housing the hopper in front of the firebox.

In accordance with the present invention, the hopper and driving means form a unit the position of which may be modified with reference to the receiving means. For instance in the case of a firebox, the arrangement comprising the hopper, the driving means and the fan may rotate with reference to the system including the feed screw conveyor and the firebox. To this end, the casing of the measuring screw and the casing of the feed screw are mounted so as to be capable of rotating with reference to one another and the feed screw is controlled through universal joints, which allows giving the desired angular position to the movable part.

The invention also comprises a special arrangement of plates surrounding the upper portion of the firebox and adapted to receive the slag. The plates interengage one another and are connected through plastic packings allowing the expansion of the plates while providing for their fluid-tightness.

In order to allow the invention to be better understood, there will be now described, with reference to accompanying drawing given out by way of example and by no means in a limiting sense, a form of execution of the invention as supplied to an automatic firebox. In said drawing:

Fig. 1 is a longitudinal cross-section of the whole arrangement.

Fig. 1a is a cross-sectional view of the screw through line Ia—Ia of Fig. 1.

Fig. 2 is an elevational view on the side opposed to Fig. 1 of the arrangement, the firebox lying on the right hand side thereof being removed.

Fig. 2a is a fragmentary top plan view of a portion of the structure shown in Fig. 2.

Figs. 4, 5 and 6 are detail views of the lateral plates.

Figure 3:
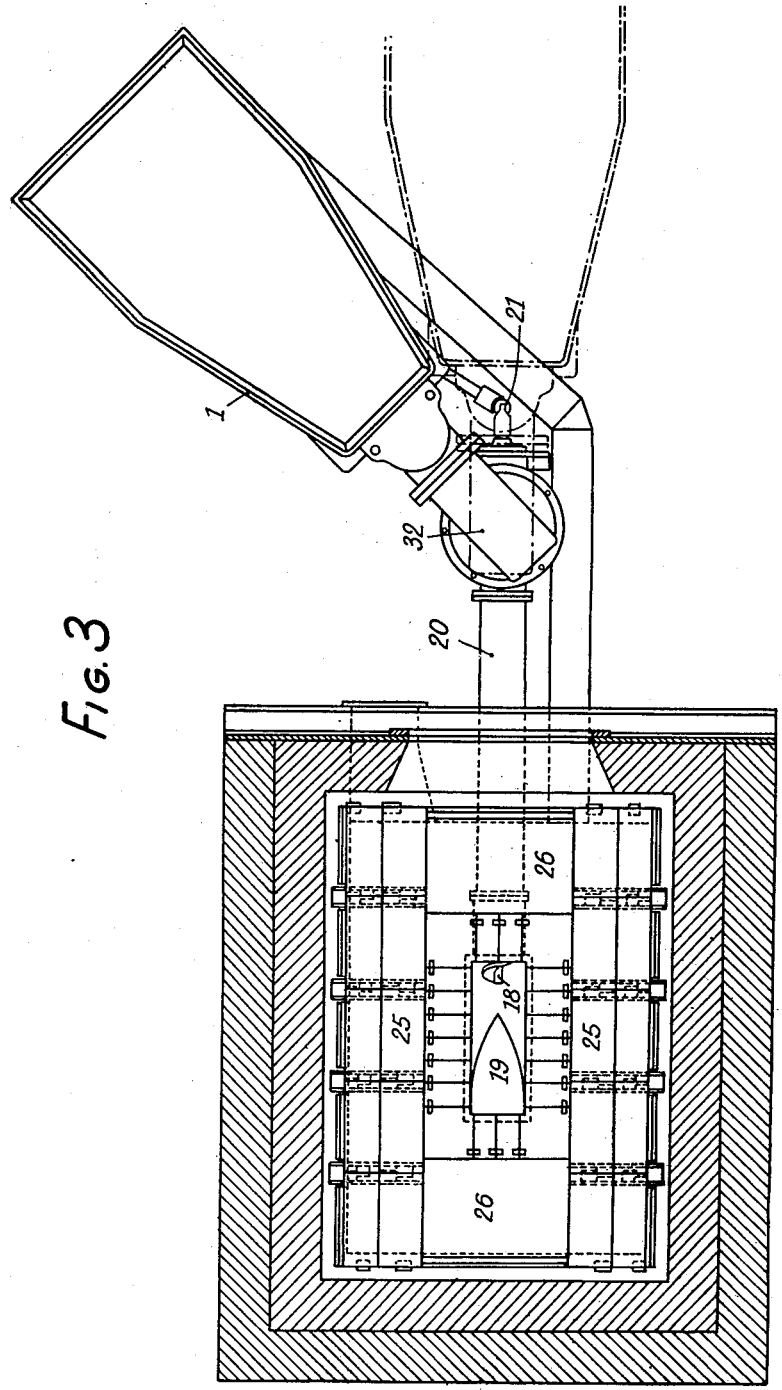
Fig. 3 is a plan view.

As apparent from the drawing, the apparatus includes a hopper 1 containing granular coal. With the prior arrangements perfect calibration was required whereas with the novel apparatus the calibration does not require a great accuracy. The hopper is provided at its upper end with a sieve 2 preventing the passage of foreign matter. A continuous stirring arrangement 3 prevents the formation of any fuel arch above the measuring screw 4. This screw is contained inside a casing 5 inside which it is adapted to slide. It is driven by a shaft 6 receiving its movement from a speed reducer 7 actuated by the motor 8. In order to allow a sliding movement of the measuring screw without its drive being interrupted thereby, there is keyed to the shaft 6 a cross member 9 engaging longitudinal ribs 10 formed inside the hollow screw 4. The position of the screw is defined by a fork 11 as shown in Fig. 2, said fork having portions engaged between flanges 12 on the screw (Fig. 1). The fork 11 is adapted to move longitudinally of the screw through the action of a leading screw 13 carrying a controlling hand-wheel 14. A pointer 15 moving in front of a scale 16 provides an indication of the output.

The measuring screw has a pitch and a diameter which varies from one end thereof to the other as apparent in Fig. 1.

A gate 17 allows access to the measuring screw in case of blocking.

The end of the measuring screw lies above the entrance of the feed screw conveyor 18 of the firebox 19. The casing 20 of this latter screw and the casing 5 of the measuring screw 4 are mounted so as to be capable of rotating one with reference to the other round the axis X—X.

To allow this movement while allowing the drive of the screw 18, the shaft of the latter is connected with the speed reducer 7 through the universal joints 21, 22.

The grate provided with air inlets 23 and 24 described hereinafter is surrounded by plates 25 and 26. The lateral plates 25 are provided with heel portions or flanges 27 as apparent in Figs. 4 to 6; said heel portions are arranged along two sides of the firebox perpendicular to the axis thereof and through part of their length. All the plates are identical and therefore when two plates are assembled, the edge of the left hand plate fits underneath the right hand plate as shown in Fig. 5 while the flange on the right hand plate engages the underside of the left hand plate, as shown in Fig. 6 so as to interengage the lateral plates in a vertical plane. It is therefore impossible to raise one plate without raising the adjacent plate.

On the other hand these plates rest on T-shaped iron members 28 inside which are fitted the above mentioned flanges or heel portions of the plates. The relative shifting of these plates is limited through the projecting parts of the double T-shaped members which provide for the interengagement of the plates in a horizontal direction.

The lateral plates are separated from one another by plastic packings 29 allowing expansion in all directions together with a certain fluid-tightness.

The operation of the system is as follows:

Assuming the motor is operative, the measuring screw 4 is driven through the agency of the pulley 30 and the reducing gear 7. The fuel passes out of the hopper through the opening 31. It is carried along by the screw 4 and falls through a chute 32 into the corresponding part of the casing 20 which forms a sort of bucket 32 out of which the fuel is removed by the feed screw 18 in order to be brought to the firebox 19. The air required for combustion purposes is fed by a fan 34 inside the space 35 out of which it passes into the nozzles 23 and the ports 24. The nozzles distribute the air inside the burning mass. The port 24 cools the slag formed which accumulates over the plates 25.

The rate of combustion may be adjusted at will by acting on a handwheel 14 which displaces the measuring screw along its axis and causes consequently a variation in output. This output as a matter of fact is defined by the capacity of the last convolution lying in front of the hopper before it passes in front of the gate 17. The displacement of the measuring screw allows increasing or reducing the output, the difference between the minimum and the maximum output being eventually very large.

As a consequence of the above disclosed features, the novel system described including a measuring screw offers considerable advantages.

The number of speeds obtained is practically indefinite as each revolution of the handwheel controlling the measuring screw produces an advancing or receding motion thereof which increases or reduces very gradually the output. This provides a means of adaptation which has been hitherto unequalled, whereby it is possible to satisfy exactly the feed requirements of the heat generator.

Through its simplicity and its rough build, the cost price of the arrangement described is much lower than that of change speed boxes.

The measuring screw rotates less rapidly than the feed screw and the convolutions of the latter are never quite full, which removes any danger of blocking therein.

In the case of fireboxes, the calibration of coal is only of secondary importance.

When the apparatus is being mounted, the possibility of modifying the angular setting of the hopper allows housing the automatic firebox provided with its novel improvements according to the invention in premises inside which it would be impossible to house a system in which all the members are rigidly interconnected.

The above arrangements have been disclosed obviously only by way of example and the different details of execution, shape, size and material used may vary in all cases without any modification in the principle of the invention.

What I claim is:

An arrangement for feeding granular and pulverulent material in association with fireboxes and the like and comprising, in combination, a material supply hopper, a measuring screw having a housing and disposed to receive material by gravity from said hopper, said measuring screw having convolutions progressively increasing in pitch and depth from one end to the other in the direction of feeding material from the hopper, means for adjusting the position of the measuring screw longitudinally relative to the hopper to vary the amount of material carried thereby from the hopper, a drive shaft axially disposed with reference to the measuring screw and having a linearly movable driving connection to the measuring screw, and said means for adjusting the position of the measuring screw including a manually operable screw displaced from and parallel to the drive shaft, a fork threadedly connected to the manually operable screw, and a flanged collar on the measuring screw movably engaged by the fork.

JEAN BERTHELOT.

REFERENCES CITED

The following references are of record in the file of this patent:

UNITED STATES PATENTS

| Number | Name | Date |
|---|---|---|
| 767,762 | McClelland | Aug. 16, 1904 |
| 1,177,792 | Mims | Apr. 4, 1916 |
| 1,831,561 | Harris | Nov. 10, 1931 |
| 2,015,526 | Kelchpel | Sept. 24, 1935 |
| 2,068,018 | Goetz | Jan. 19, 1937 |
| 2,119,941 | Chalker | June 7, 1938 |
| 2,126,776 | Hogg | Aug. 16, 1938 |
| 2,191,219 | Peltz | Feb. 20, 1940 |
| 2,194,006 | Carter | Mar. 19, 1940 |
| 2,228,947 | Casey | Jan. 14, 1941 |
| 2,306,189 | Schwerckart et al. | Dec. 22, 1942 |
| 2,388,294 | Shaffer et al. | Nov. 6, 1945 |